(No Model.)
T. LOHNSTEIN.
HYDROMETER.
No. 536,316. Patented Mar. 26, 1895.
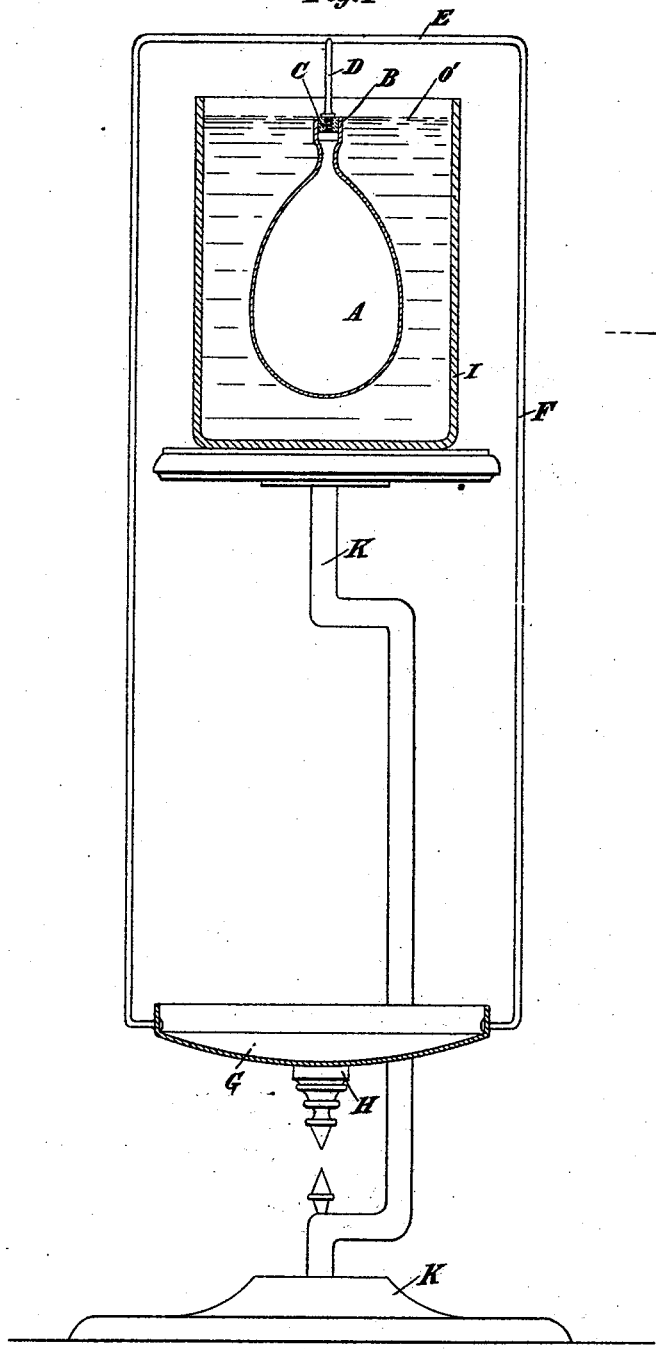
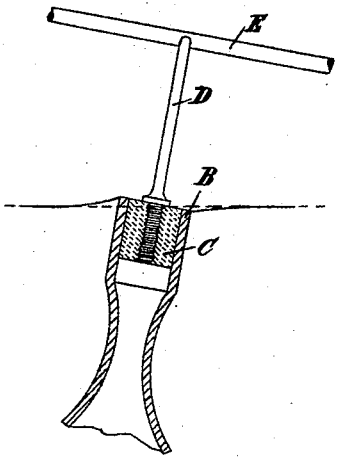
Witnesses:
Arthur H. Abell.
A. D. Harrison.
Inventor:
T. Lohnstein
by Wright Brown Crosby
Atty.

UNITED STATES PATENT OFFICE.

THEODOR LOHNSTEIN, OF BERLIN, GERMANY.

HYDROMETER.

SPECIFICATION forming part of Letters Patent No. 536,316, dated March 26, 1895.

Application filed April 16, 1894. Serial No. 507,634. (No model.) Patented in Germany December 8, 1892, No. 73,908.

*To all whom it may concern:*

Be it known that I, THEODOR LOHNSTEIN, doctor of philosophy and medical undergraduate, of No. 2011 Kaiser Wilhelmstrasse, Berlin, in the German Empire, have invented a new and useful Improved Float for Determining the Absolute Weight and Specific Gravity of Solid and Liquid Bodies, (for which I have received a patent in Germany, No. 73,908, dated December 8, 1892,) of which the following is a specification, reference being had therein to the accompanying drawings.

The instruments known as areometers, hitherto employed in determining the specific gravity of liquid and solid bodies, and based upon the application of the Archimedean hydrostatic principle have all exhibited a very marked tendency to become unreliable under the influence of capillarity. As is well known, according to the nature of the liquid and solid bodies which are brought in contact with each other (including the body of the areometer itself) there forms upon the spindle of the instrument, as a result of capillarity, a concave or convex swelling, which is apt very considerably to affect the depth of immersion of the spindle. Hence the application of the Archimedean principle only, in the construction of the scale of the instrument, must necessarily become somewhat misleading. The influence of capillarity, may, indeed, be ascertained by computation, but the corrections thus arrived at depend upon two physical quantities, in addition to the diameter of the areometer spindle; namely, on the superficial pressure of the liquid, and on the angle, which the surface of the liquid forms with the surface of the areometer spindle, in the line of taction. The first of these quantities, provided the liquid is absolutely pure both in its body and surface, is a constant one though it is apt to vary considerably whenever there is the slightest impurity in the liquid; but more important variations still are liable to occur in the case of the second quantity, viz., the so-called "marginal angle" which is dependent upon the absolute purity of two surfaces. If these facts be true in the case of one particular liquid it follows that, in establishing a scale for an instrument intended for testing liquids of every conceivable kind or description, the influence of capillary attraction cannot be calculated with anything like reliable accuracy.

In the case of those areometers, the readings of which vary within a wide range, say from 0.7 to 1.0 or from 1.0 to 2.0 capillary attraction, as a source of error, does not call for very serious consideration, since so long as the readings fluctuate between ordinary requirements variations arising from that source would be generally represented by the third place after the decimal point, but in instruments in which, the range being narrower, greater precision is necessarily the object, the inconvenience due to capillary attraction is apt to manifest itself in a very objectionable manner; in addition to which correct reading is interfered with by optical peculiarities.

The drawbacks are entirely obviated by the improved areometer constructed in accordance with this invention, which comprises a novel arrangement whereby the usual swelling produced by capillarity is entirely removed, thus enabling the Archimedean principle to be strictly carried out.

In order to make this specification more easily intelligible, reference is had to the accompanying drawings, in which similar letters denote similar parts throughout both views, Figure 1 being a sectional elevation of my improved apparatus, and Fig. 2, a detail section showing the top of the float.

As shown in Fig. 1 of the accompanying drawings, the instrument consists of a hollow body A, made of glass, and terminating in an open cylindrical extension. This extension being cut off exactly at right angles to its axis, has an edge B which, from optical considerations is cut or ground in such a manner that facets of any kind are entirely avoided. With the cylindrical end piece a nut C, made of metal or hard rubber, is cemented for facilitating the attachment of the wire frame D E F carrying the weighing basin or dish G. The said frame consists of a vertical rod D, a horizontal rod E and two more vertical rods F to which the dish or basin G is secured in any suitable manner. To the dish is attached the device H which indicates the vertical or perpendicular position of the floating body A. The rods or wires F are sufficiently long to permit the float A to be readily inserted into the vertical cylinder I, which receives the liquid without necessitating the disconnection of the screw joint at C. The cylinder I rests upon a stand or support K of suitable construction. Any too extensive displacement or undue sinking of the float may be prevented by very simple arrangements. The weight of the unweighted float is so balanced that it will float in a vertical position, in a liquid of 0.7000 specific gravity and at a temperature of 15° centigrade, and the liquid will reach to the extreme edge of the top piece B, while any capillary deflection of the surface of the liquid totally disappears throughout the marginal line. When however the unweighted float is placed in a liquid of greater specific gravity, a proportional part of the float only will be immersed in the liquid, or situated below its surface. By gradually weighting the float, a condition of things will be first brought about in which the liquid, while moistening the whole surface of the float, will with its free surface $o'$ touch the external sharp edge of the top piece B; and by continuing the weighting operation the capillary deformation of the surface $o'$ may be caused to cease entirely, so that the surface of the liquid forms an exactly horizontal plane or level surrounding the float. This arrangement may indeed be dispensed with altogether in an instrument capable of tolerably even and uniform action, inasmuch as there are innumerable other arrangements, which can be used to counteract the influence of capillarity or, in other words, to carry out the Archimedean principle to the full extent. Where for instance, the upper edge of the float deviates but little from the horizon, convenient weighting arrangements may be adopted in which the surface of the liquid presents partly convex and partly concave curves at the edge. When therefore the two species of curves extend over the same part of the marginal line, as illustrated in Fig. 2, the laws of theory teach us that the total weight sustained by the float will be equal to the weight which is required to cause the disappearance of the meniscus, while the edge continues in the horizontal position. The observer's eye will require but very little practice to be able to detect this condition of things, where it exists, by simply observing the reflections of the surface of the liquid.

The precision of the improved areometer is mainly due to the relation existing between the cylindrical end piece and the total volume of the float. Supposing, for example, that the former is six millimeters and the latter thirty cubic centimeters, and assuming that an average deviation of the upper marginal line, from the level surface of the liquid amounting to only 0.01 millimeters is observable (which result can be obtained with very little practice) this instrument will enable the specific gravity of the given liquid to be ascertained within the proportion of one to thirty thousand, provided that the capillary pressure is as high as it generally is in the case of perfectly pure water. I am therefore justified in stating that this instrument, if constructed as stated in regard to its size, will enable the specific gravity of liquids to be accurately determined, at least as far as the four first figures after the decimal will go.

Corresponding with the volume of the float there is provided in addition to the arrangement herein described, a set of ordinary weights which need not here be further dwelt on, and which are so arranged that they enable the specific gravity of the liquid which is being tested to be registered from them without any particular calculation.

To obtain precise readings, the temperature should also be taken into account; but as this point is regulated by the well known rules of the physical science, it need not be further considered here; and, likewise, it will be sufficient merely to mention in a cursory way that for special purposes of areometry, instruments based upon the same principle may readily be constructed in a simplified form. It will also easily be understood that the principle of this invention may be extended also to the calculation of the specific gravity of solid bodies if required, it being only necessary for this purpose to use the handle of a Nicholson areometer and in lieu of the "mark" to provide it with a sharp edge.

Another possible application of the same principle which deserves to be specially mentioned, is the construction of hydrostatic substitution balances. Supposing for example that the float here described is first equilibrated with a full set of weights, and next, after the removal of part of the weights, with any other object, it will be obvious that the weights removed will indicate or represent the weight of that object. By direct observation the sensitiveness of a scale such as this may be brought down to one milligram, while greater weights may be easily brought under the control of the instrument by increasing the bulk and therefore the weight of the float. Temperature will influence this equilibrating process only to the extent to which the temperature of the water is apt to change during the time occupied in the test and which does not exceed a few minutes. This source of error of course may be provided against by the aid of a suitable table of reference. A great advantage of this scale is its very moderate cost. By foregoing direct observation on the surface of the liquid, and employing suitable auxiliary devices enabling the results of the tests to be read off by means of a small microscope assuming the maximum weight to be about five hundred grams, the precision of the instrument can be brought down to 0.1 milligrams. This, of course will make the instrument a little more expensive, but its cost will still be far below that of any of the ordinary instruments hitherto employed for like purposes.

What I claim, and desire to secure by Letters Patent of the United States, is—

A device for determining the absolute weight and specific gravity of bodies, the same comprising a hollow float having a cylindrical extension cut off at right angles to its axis to form a sharp edge; and a weight-sustaining frame connected with the cylindrical extension of the float.

THEODOR LOHNSTEIN.

Witnesses:
PAUL FISCHER,
HANS CAVERHIN.